United States Patent
Baltz et al.

(10) Patent No.: US 8,271,328 B1
(45) Date of Patent: Sep. 18, 2012

(54) USER-BASED ADVERTISEMENT POSITIONING USING MARKOV MODELS

(75) Inventors: Edward A. Baltz, Mountain View, CA (US); Khanh Nguyen, Cupertino, CA (US); Ralph U. Gasser, Palo Alto, CA (US); Michael Frumkin, Santa Cruz, CA (US); Karthik Gopalratnam, Mountain View, CA (US); Myles Sussman, San Francisco, CA (US); Gregory J. Friedman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 831 days.

(21) Appl. No.: 12/337,066

(22) Filed: Dec. 17, 2008

(51) Int. Cl.
G06Q 30/00 (2012.01)

(52) U.S. Cl. .............. 705/14.4; 705/14.49; 705/14.53; 705/14.54; 705/14.52; 705/7.29; 705/7.31; 705/7.33; 706/1; 706/15; 706/45; 706/61

(58) Field of Classification Search ........ 705/14.1–14.73, 705/7.29–7.31; 706/12–62; 707/999.003
See application file for complete search history.

(56) References Cited

U.S. PATENT DOCUMENTS

| | | | |
|---|---|---|---|
| 6,285,999 B1 * | 9/2001 | Page | 1/1 |
| 7,370,002 B2 * | 5/2008 | Heckerman et al. | 705/14.41 |
| 2003/0158776 A1 * | 8/2003 | Landesmann | 705/14 |
| 2004/0044565 A1 * | 3/2004 | Kumar et al. | 705/14 |
| 2007/0143260 A1 * | 6/2007 | Markov et al. | 707/3 |
| 2008/0091526 A1 * | 4/2008 | Shoemaker | 705/14 |
| 2008/0114751 A1 * | 5/2008 | Cramer et al. | 707/5 |
| 2008/0147485 A1 * | 6/2008 | Osagami et al. | 705/10 |
| 2008/0249844 A1 * | 10/2008 | Abe et al. | 705/10 |

FOREIGN PATENT DOCUMENTS

JP 2007-249306 * 9/2007

OTHER PUBLICATIONS

Mukund Deshpande and George Karypis, "Selective Markov Models for Predicting Web Page Accesses", University of Minnesota, Technical report #00-056.*
English machine translation of JP 2007-249306.*
U.S. Appl. No. 12/210,054, filed Sep. 12, 2008, Arbanovella, E. et al.
U.S. Appl. No. 12/388,434, filed Feb. 18, 2009, Frumkin, M. et al.

* cited by examiner

Primary Examiner — Khanh H Le
(74) Attorney, Agent, or Firm — Fish & Richardson P.C.

(57) ABSTRACT

Methods and systems to modify the number and/or positioning of advertisements presented to a user based on that user's activity patterns (e.g., previous queries, query result selections, ad selections, etc.) and the order in which events constituting the activity patterns occurred. For example, the methods and systems can be based on a Markov model utilizing the user's activity patterns.

21 Claims, 5 Drawing Sheets

USER-BASED ADVERTISEMENT POSITIONING USING MARKOV MODELS

BACKGROUND

This disclosure relates to interactive media advertising.

Interactive media (e.g., the Internet) provides the capability to target advertisements ("ads") to receptive audiences. For example, some websites provide information search functionality that is based on keywords entered by a user seeking information. This user query can be an indicator of the type of information of interest to the user. By comparing the user query to a list of keywords specified by an advertiser, it is possible to provide targeted ads to the user.

In such an advertising model, ads targeted based on query keywords are sent to the user to be presented with search results responsive to the query. Generally, this advertising model does not vary how targeted ads are presented to the user. For example, for a given query and set of search results, the number of targeted ads and the positioning of the targeted ads on a search result page are the same for all users submitting the given query.

If a user, however, does not exhibit behavior evidencing interest in the advertisements, then showing the user numerous advertisements in many various positions may not be the best use of the advertisers resources. Likewise, if a user exhibits behavior evidencing interest in advertisements, then showing the user numerous advertisements in many various positions will likely result in increasing brand recognition and/or selection of one or more of the advertisements by the user, which, in turn, is beneficial to the advertisers.

SUMMARY

In general, the subject matter of this specification relates to systems and methods to provide user-based ad positioning. One aspect of the subject matter described in this specification can be embodied in a method. The method includes receiving advertisements to be displayed to a user and accessing user history data that defines a set of past user events associated with the user and also defines an order in which the past user events occurred. The method also includes generating sequences of data from the set of past user events. The sequences include a first sequence and one or more successive sequences successive to the first sequence. The first sequence includes user history data defining a past user event from the set of past user events. Each successive sequence includes user history data of the previous sequence and user history data defining an additional past user event from the set of past user events. The additional past user event is selected according to the order in which the past user events occurred. The method further includes generating positioning data based on the sequences. The positioning data determines the number and/or positioning of the advertisements to be displayed to the user. The method also includes providing the advertisements for display to the user as determined by the positioning data.

Another aspect of the subject matter described in this specification can be embodied in a system having a user history data store storing user history data. The user history data defines a set of past user events associated with the user and an order in which the past user events occurred. The system includes a positioning system configured to receive advertisements to be displayed to the user, access the user history data store, and generate sequences of data from the set of past user events. The sequences include a first sequence and one or more successive sequences successive to the first sequence. The first sequence includes user history data defining a past user event from the set of past user events. Each successive sequence includes user history data of a previous sequence and user history data defining an additional past user event. The additional past user event is selected according to the order in which the past user events occurred. The positioning system is also configured to generate positioning data based on the sequences and provide the advertisements for display to the user as determined by the positioning data. The positioning data determines the number and/or positioning of the advertisements to be displayed to the user.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

§1.0 Advertising System Overview

The methods and systems described herein relate to modifying the number and/or positioning of ads presented to a user, in response to the user's query submission, based on the user's activity patterns (e.g., previous queries, query result selections, ad selections, etc.) and the order in which events constituting the activity patterns occurred. The order is defined by a data sequence that defines a set of past user events associated with the user and the order in which the past user events occurred.

The activities of a user can be indicators of the commerciality of the user. The commerciality of a user is indicative of how a user's receptiveness and/or interests in advertisements and/or commercial offerings. For example, if a user's ordered activity patterns indicate that the user is a commercial user, e.g., often selects ads or evidences some other activity that indicates the user is interested in commercial offerings, then the number of ads provided for display to the user can be increased. Conversely, if a user's ordered activity patterns indicate that the user is a non-commercial user, e.g., the user rarely selects ads or is not interested in commercial offerings, then the number of ads provided for display to the user can be decreased.

Predicting the commerciality of a user based on the user's ordered activity patterns can be accomplished by implementations utilizing, for example, Markov models. Such implementations permit modification of the number and/or positioning of ads presented to a user (based on the predicted commerciality of that user) to enhance the user's experience.

Figure 1:
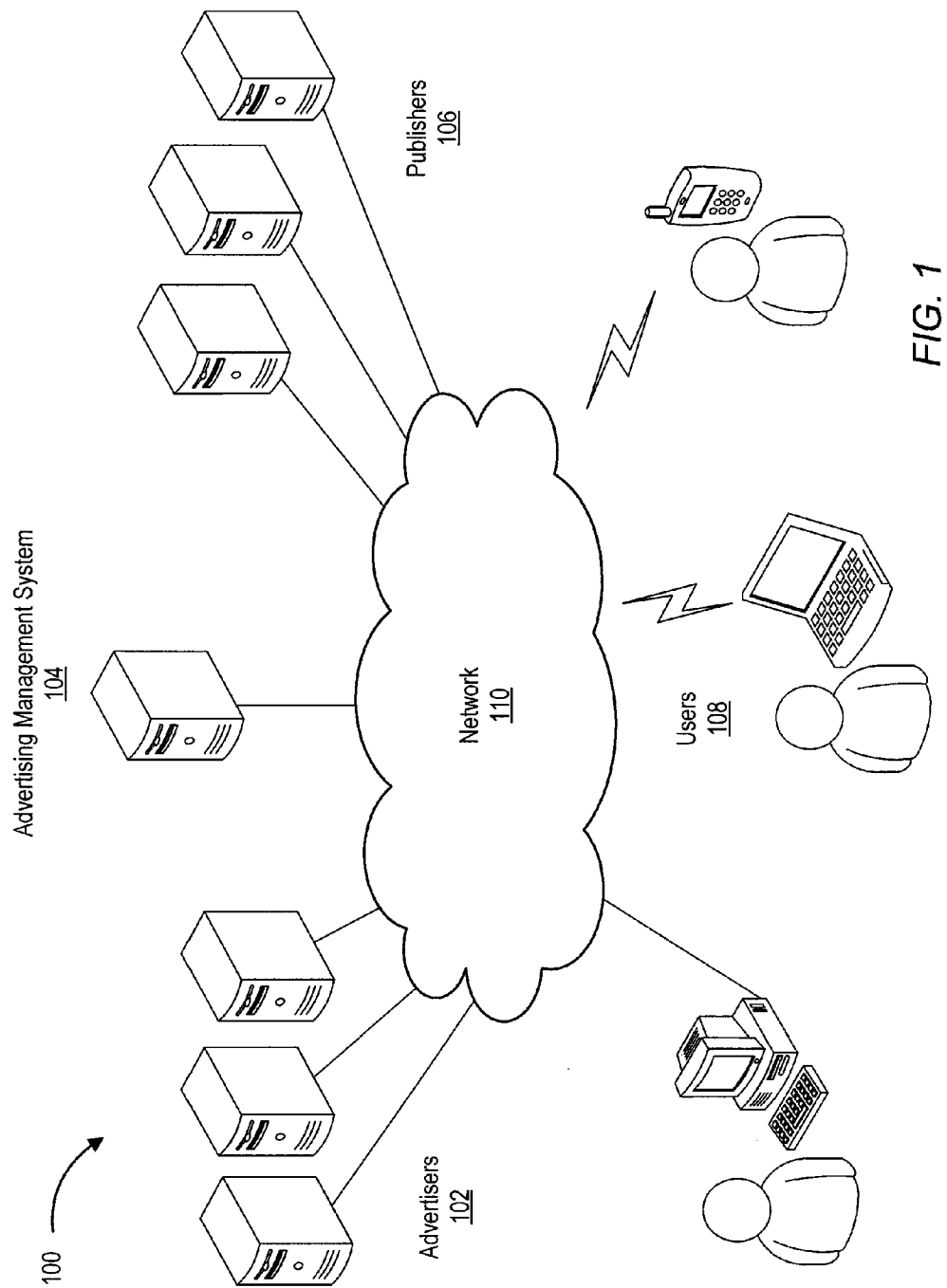
FIG. 1 is a block diagram of an on-line advertising environment.

FIG. 1 is a block diagram of an on-line advertising environment 100. A computer network 110, such as a local area network (LAN), wide area network (WAN), wireless network, peer-to-peer network, the Internet, or a combination thereof, connects advertiser devices 102 (referred to hereafter as "advertisers 102") an advertising system 104, publisher devices 106 (referred to hereafter as "publishers 106"), and user devices 108.

In some implementations, the advertisers 102 can directly, or indirectly, enter, maintain, and track advertisement information in the advertising management system 104. The ads may be in the form of graphical ads, such as banner ads, text only ads, image ads, audio ads, video ads, ads combining one or more of any of such components, etc. The ads may also include embedded information, such as a links, meta-information, and/or machine executable instructions. The publishers 106 may submit requests for ads to the system 104. The system 104 responds by sending ads to the requesting publisher 106 for placement on one or more of the publisher's web properties (e.g., websites and other network-distributed content).

Other entities, such as the user devices 108 and the advertisers 102, can provide usage information to the system 104, such as, for example, whether or not a conversion or click-through related to an ad has occurred. This usage information can include measured or observed user activity patterns related to ads that have been served. The system 104 performs financial transactions, such as crediting the publishers 106 and charging the advertisers 102 based on the usage information.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user device 108 that requested the content for presentation in a viewer (e.g., a browser or other content display system). The content server can transmit information about the ads back to the ad server, including information describing how, when, and/or where the ads are rendered (e.g., in HTML or JavaScript™)

Another example publisher 106 is a search service. A search service can receive queries for search results. In response, the search service can retrieve relevant query results from an index of documents (e.g., from an index of web pages). Query results can include, for example, lists of web page titles, snippets of text extracted from those web pages, and hypertext links to those web pages, and may be grouped into a predetermined number of (e.g., ten) results.

The search service can submit a request for ads to the system 104. The request may include a number of ads desired. This number may depend on the query results, the amount of screen or page space occupied by the query results, the size and shape of the ads, etc. In some implementations, the number of desired ads will be from one to ten, or from three to five.

The request for ads may also include the query (as entered or parsed), information based on the query (such as geo-location information, whether the query came from an affiliate and an identifier of such an affiliate), and/or information associated with, or based on, the results. Such information may include, for example, identifiers related to the query results (e.g., document identifiers or "docIDs"), scores related to the query results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the query results with one or more of the ads provided by the system 104. This combined information can then forwarded to the user device 108 that requested the content. The query results can be maintained as distinct from the ads, so as not to confuse the user between paid advertisements and presumably neutral query results. Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

§2.0 Detailed System Architecture and Operation

Figure 2A:
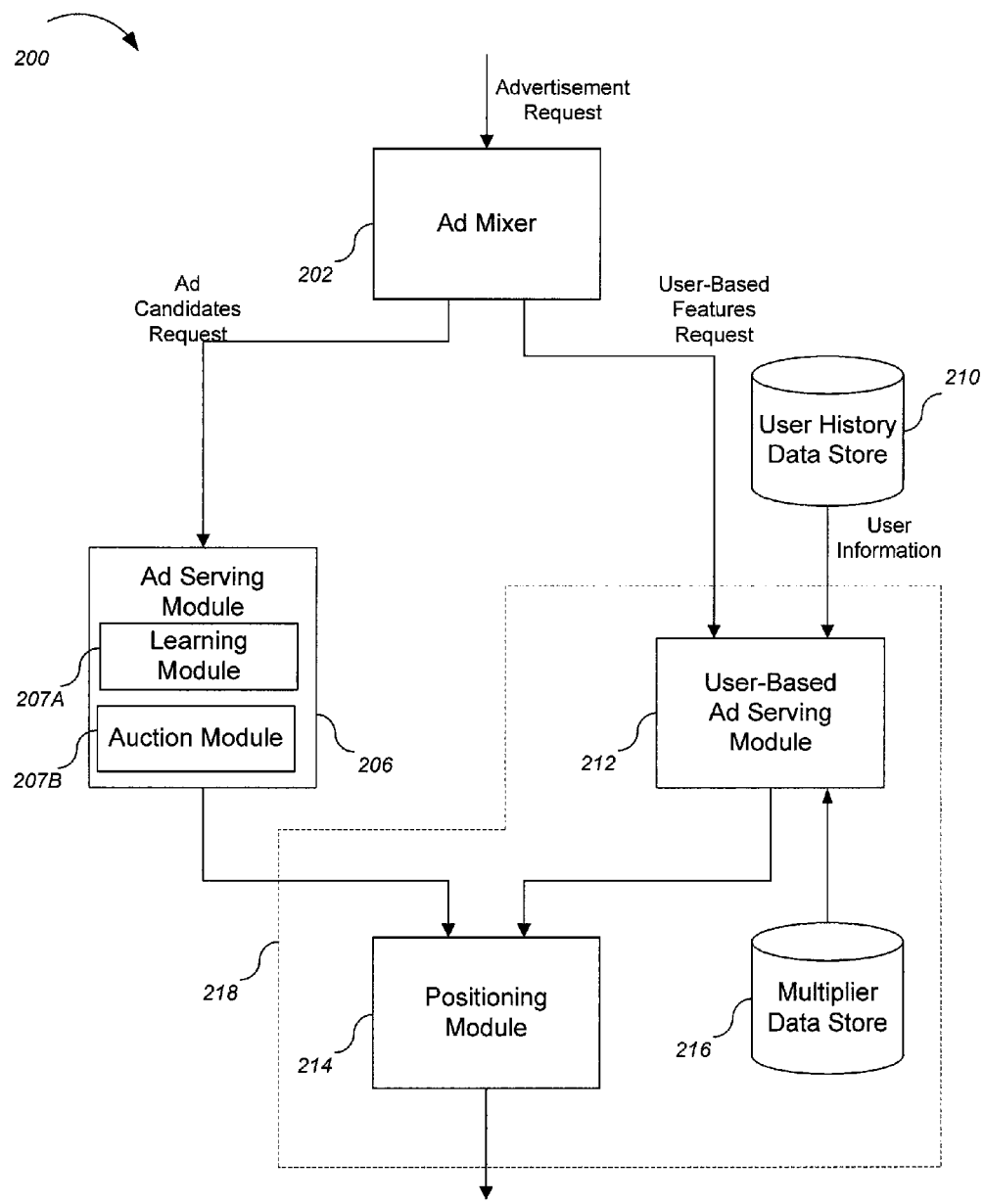
FIG. 2A is a block diagram of an example implementation of an advertising serving system of the advertising management system of FIG. 1.

FIG. 2A is a block diagram of an example implementation of an ad serving system 200 of the advertising management system 104 of FIG. 1. The advertising serving system 200 determines at least one of a number and positioning of the advertisements to be displayed to the user ad serving system 200. The system 200 receives an ad request for one or more ads, and provides one or more positioned ad candidates in response to the ad request. A positioned ad is an ad that has been associated with a particular ad slot location that determines where the ad will be positioned on a page (e.g., a query results page or a requested content page) when the page is provided for display to a user. In some implementations, the ad request is submitted by a search service and specifies a number of ads desired to accompany search results for a user-submitted query. In other implementations, the ad request is submitted by a content server and specifies a number of ads desired to accompany content requested by a user.

The ad request is received by an ad mixer 202 in the ad serving system 200. If the ad request is submitted by a search service, the ad request can include the query and information about the query (e.g., time of submission). In response to the ad request, the ad mixer 202 generates an ad candidates request and a user-based features request. The ad candidates request can include the query terms or keywords and the desired number of ads, if specified in the ad request. The user-based features request can include an identifier or anonymized identifier associated with the user submitting the query.

An ad serving module 206 receives the ad candidates request. The ad serving module 206 uses the query terms or keywords to select one or more ad candidates (e.g., from an ad repository) that are related to the query terms or keywords. An ad candidate selected by the ad serving module 206 can exactly "match" a given keyword of the query, for example, if the advertiser of the ad candidate previously specified that the advertiser wants the ad candidate to be presented when a user-submitted query contains the given keyword. Alternatively, an ad candidate may not exactly "match" the given keyword but may still be selected, for example, if the advertiser previously specified that the advertiser wants the ad candidate to be presented when a user-submitted query contains a particular term, where the particular term is similar to (e.g., a synonym of) the given keyword.

In some implementations, the ad serving module 206 includes a learning module 207A. The learning module 207A receives the ad candidates and one or more general features associated with the ad candidates or with the query. In some implementations, the general features include information about the type of ad candidates passed to the learning module or the type of query submitted by the user. In some implementations, the general features include statistics computed from data logs of user activity patterns, where the same query was submitted by other users or the same ad candidates were presented to and selected by other users. The learning module can use the general features and a statistical model to estimate the quality of individual ad candidates.

One measure of ad quality is a predicted click through rate (CTR). When a user selects an ad by clicking on it, embedded hypertext links typically direct the viewer to the advertiser's web site. Such a process is commonly referred to as a "click-through." The term "click-through" is intended to cover any user selection. The ratio of the number of click-throughs to the number of impressions of the ad (e.g., the number of times the ad is displayed) is commonly referred to as the "click-through rate" of the ad (e.g., a probability that an ad will be clicked/selected). In some implementations, the learning module generates a predicted CTR as a quality score for each ad candidate it receives.

In some implementations, the ad serving module 206 includes an auction module 207B. The auction module determines the best predetermined number of candidate ads to present to the user and the order in which to present the candidate ads based on the quality scores (e.g., CTR predictions) and target bids (e.g., specified by advertisers) for all the candidate ads. In some implementations, the predetermined number of candidate ads to be presented is the number of desired ads specified in the ad request sent to the ad serving system 200. The set of ordered ad candidates or the set of ordered ads candidates and their respective CTR predictions can be passed from the ad serving module 206 to a positioning module 214.

In some implementations, while the ad service system 200 generates a set of ordered ad candidates, the system 200 generates, in parallel or substantially in parallel, user-based positioning data. The user-based positioning data determines the number and/or positioning of the ordered ad candidates to be displayed on a page when the page is provided for display to a user. The positioning data are based on information associated with the user, e.g., patterns related to the user's past query activities and responses to returned query results pages, the pages including query results and/or ads (the past query activities and subsequent responses may be referred to as "past user events" herein). Generating the positioning data in parallel with the ordered set of ad candidates can prevent or minimize latency added to the ad serving process due to generation of the positioning data.

As discussed above, the ad mixer 202 generates a user-based features request, which can include an identifier associated with the user responsible for the submitted query. For example, the identifier can identify the user that submitted the query, e.g., using user login data provided to the search service. In another example, the identifier can also anonymously identify the device (e.g., a laptop or a mobile phone) from which the query originated. A device identifier can be, for example, a cookie or an Internet Protocol (IP) address. In some implementations, the identity of the user is protected by use of one or more anonymization processes. For example, the user history and login association, or device history and address association, can be anonymized by use of collision-resistant hashes that hash the identification data. Additional privacy protection techniques can also be used, such as the use of one or more encryption processes.

In some implementations, the user-based features request is sent from the ad mixer 202 to a user-based ad serving module 212 (the user-based serving module 212 and the positioning module 214 are collectively referred to as a positioning system 218, as indicated by the dashed system border surrounding the user-based serving module 212 and the positioning module 214). The positioning system 218 can be configured to generate the positioning data based on the commerciality of the user, which can be predicted based on the user's past query-related activities (e.g., past user events) and the order of the activities stored in a user history data store 210. Example data the is stored in the user history data store 210 can include queries submitted by users, actions taken by the users in response to a results page that includes search results and one or more advertisements, such as selections of particular advertisements, and the time between such actions, as described in more detail below.

In some implementations, when a user-based features request is received, the user-based ad serving module 212 accesses the user history data store 210 that stores the data defining past user events to retrieve past user events specific to the user responsible for the user-based features request. The user-based ad serving module 212 also accesses a multiplier data store 216 storing positioning multipliers and selects one or more positioning multipliers corresponding to the retrieved past user events.

Each positioning multiplier or set of positioning multipliers indicates the commerciality of a user that performed a particular past user event (or sequence of past user events in a specific order) based on previous user activity patterns of users from a user population. For example, based on previous activity patterns it may be known that users having a particular activity pattern (e.g., submit query and then select multiple ads presented with the query results page) tend to be users of high commerciality. Thus the positioning multiplier (commerciality score) corresponding to that particular activity pattern (e.g., a sequence of past user events) would associate that pattern with a highly commercial user. Based on the relevant positioning multipliers, the positioning module 214 can generate positioning data that defines the number and/or positioning of the ordered ad candidates received from the ad serving module 206.

In some implementations, positioning multipliers are based on a commercially neutral value of 1. As such, sequences indicating a commercial user correspond to positioning multipliers having a value greater than 1 and sequences indicating a non-commercial user correspond to positioning multipliers having a value less than 1. In some implementations, the proportionality of the positioning multiplier relative to the commerciality of the user can be logarithmic; in other implementations, the proportionality can be linear. Other functional relations can also be used.

In some implementations the value of a positioning multiplier for a particular sequence of events can be determined based on the differences in commerciality for that sequence as compared with a baseline or average commerciality. For example, a particular sequence of three searches with a top ad selection occurring after the third search can be selected as an event sequence for a commercially neutral user. As mentioned above, sequences indicating a commercially neutral user can correspond to a positioning multiplier value of 1. Accordingly any comparable sequences in which a user selects more than one ad during the course of three searches can be considered as indicating the user is a commercial user, and those sequences can be assigned positioning multiplier values greater than 1 (e.g., 1.1). Thus a sequence in which a user selects four ads during the course of three searches would correspond to a higher positioning multiplier value than a sequence in which a user selects three ads during the course of three searches. Likewise, sequences in which users do not select any ads during the course of performing three searches would correspond to positioning multiplier values of less than 1. Other schemes to assign positioning multipliers to sequences can also be used.

In some implementations, the values of positioning multipliers assigned to the sequences can be refined to optimize performance metrics such as click-through-rate or other return-on-investment measures. For example, a positioning multiplier assigned to a sequence may indicate that users performing that sequence are non-commercial users (e.g., rarely select ads). Such a positioning multiplier can cause a decrease in the number of ordered ad candidates provided for display to users performing that sequence. However, if it is subsequently determined that users performing that sequence frequently select ads more often relative to other sequences that have a higher positioning multiplier, then the positioning multipliers assigned to the sequences can be adjusted to reflect these relative commercial behaviors. Likewise, if the positioning multipliers assigned to sequence result in an overall performance decrease (e.g., an overall lower ROI), then the positioning multiplies can be adjusted as needed until performance is optimized.

§2.1 Positioning System Operation

In some implementations, the generation of positioning data by the positioning system 218 is based on a Markov model (MM). For example, the generation of positioning data may be based on, at least in part, Equation 1:

$$MM = E3 * T3 * M3 * ET1 * EM1 * TM1 * ETM1 \quad (1)$$

where:

MM is a Markov model based on three events;

E3 is a sequence of data based on three past user events (e.g., from the user history data);

T3 is a sequence of data based on time information associated with the three past user events (e.g., from the user history data);

M3 is a sequence of data based on a display configuration of ads presented to a user in association with the three past user events (e.g., from the user history data);

ET1 is a sequence of data based on a combination of the most recent of the three past user events and the time information associated with that event;

EM1 is a sequence of data based on a combination of the most recent past user event and ad display configuration information associated with that event;

TM1 is a sequence of data based on a combination of the time information from ET1 and the ad display configuration information from EM1; and ETM1 is a sequence of data based on a combination of the most recent past user event and the time and ad display configuration information from TM1.

Each sequence of data corresponds to a positioning multiplier. Thus, as the positioning multipliers are indicative of the commerciality of the user, the sequences of data can be used to predict the commerciality of a user. For example, the positioning multipliers can be selected so that the final product is proportional to the probability a user will select advertisements.

Other exemplary Markov models can be based on a different number of events, i.e., more or less than three user events, and need not be restricted to the component set (i.e., E3, T3, M3, ET1, EM1, ETM1) used by Equation 1.

Figure 2B:
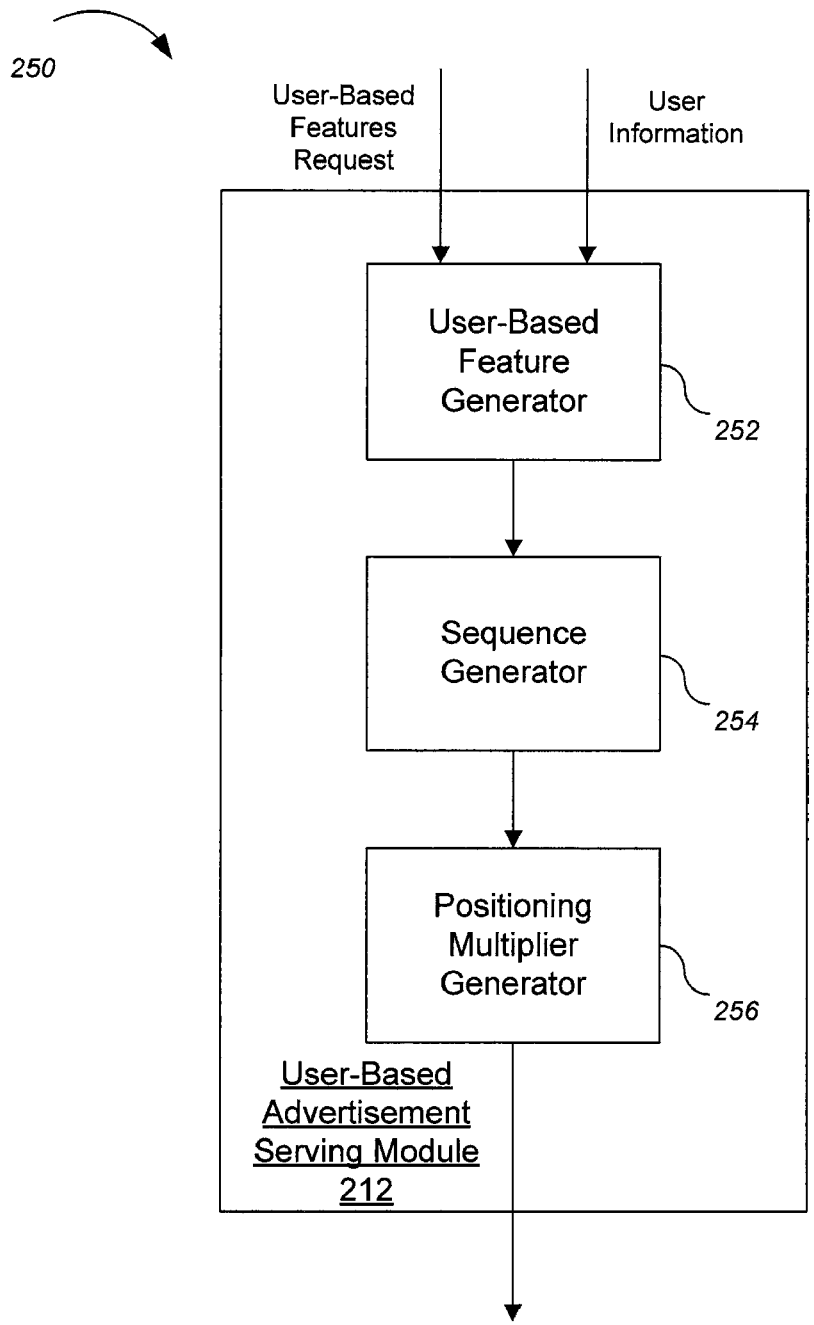
FIG. 2B is a block diagram of an example implementation of a user-based advertisement serving module of the advertising serving system of FIG. 2A.

FIG. 2B is a block diagram of an example implementation 250 of a user-based ad serving module 212 of the advertising serving system 200 of FIG. 2A. The user-based ad serving module 212 can access the user history data and construct, for example, the components of Equation 1. The example implementation 250 includes a user-based feature generator 252, a sequence generator 254, and a positioning multiplier generator 256. Other implementations of user-based ad serving modules can have fewer or more generators, and the functions of the generators may be combined or separated.

The user-based feature generator 252 can use the identifier associated with the user to retrieve or determine one or more user-based features associated with the user for personalizing ad positioning. For example, the user-based feature generator 252 can use the identifier to access user history data store 210 to retrieve information specific to the user (e.g., a set of past user events associated with the user). The user specific information can then be used to generate, for example, the component set of Equation 1.

In some implementations, the identifier is a cookie and the user history data can be derived from the cookie data. For example, the cookie data can include a key representing past user events associated with the user and the order in which the events occurred. The user-based ad serving module 212 can use the key to look-up (construct) user history data for the user from, for example, the user history data store 210.

In other implementations, the cookie can include the user history data (e.g., past user events) for the user instead of a key representing the past user events. In such an example the cookie occupies the role of the user history data store 210, albeit on a per-user basis. In still other implementations, user history data can be anonymously logged and stored in the user history data store 210 according to user. The user-based ad serving module 212 can use the identifier to identify a particular user and access the corresponding user history data for that user from the user history data store 210.

Past user events correspond, for example, to the actions of the user in response to a query submitted by the user or the action and the query. Example past user events include no query results or advertisements selected, one query result selected from a first set of query results (e.g., the results returned on the first results page in the first four positions), one query result selected from a second set of query results (e.g., the results returned on the first or subsequent results pages exclusive of the first four positions), multiple query results selected, a top advertisement selected, a right-hand-side (RHS) advertisement selected, multiple advertisements selected, both a query result and an advertisement selected, and no history available. The past user events defined by the user history data can generally be represented as e1, e2, e3, . . . eN; with e1 being the most recent past user event and eN being the first occurring past user event in the sequence or series of past user events. Such past user events can be used to generate component E3 of Equation 1.

The user history data stored in the user history data store 210 can also include time data defining for each of the past user events a time associated with the event. For example, the time associated with the past user event can be the duration between the queries associated with past user events. As such, if e1 occurred two minutes after e2 and e2 occurred twenty seconds after e3, then the time data t1 (representing the timing of the query associated with e1) is two minutes and the time data t2 (representing the timing of the query associated with e2) is twenty seconds. The time data can also define buckets corresponding to a minimum duration and a maximum duration between queries (e.g., a first bucket for query-to-query durations less than twenty seconds, a second bucket for query-to-query durations between twenty seconds and ninety seconds, etc.). The time data can be used to generate component T3 of Equation 1.

The user history data stored in the user history data store 210 can further include impression type data defining for each of the past user events a display configuration of ads associated with the event. Exemplary display configurations include no ads displayed, all RHS ads slots occupied with displayed ads (e.g., eight RHS ads displayed), less than all RHS ads slots occupied with displayed ads and no top positioned ads, less than all RHS ads slots occupied with displayed ads and one or more top positioned ads (e.g., zero RHS ads and one or more top ads, or three RHS ads and one top ad), etc. The impression type data associated with a set of past user events can be represented as m1, m2, m3, . . . mN; with m1 being the impression type data associated with the most recent past user event (e1)) and mN being the impression type data associated with the first occurring past user event (eN). The impression type data can be used to generate component M3 of Equation 1.

The user history data stored in the user history data store 210 can be partitioned according to impression type data (e.g., m1, m2, m3, etc.), past user events (e1, e2, e3, etc.), and time data (e.g., t1, t2, t3, etc.). The user history data store 210 can also be partitioned according to related past user events, impression type data, and time data (e.g., e1, m1, t1; e2, m2, t2; etc.)

The sequence generator 254 of the user-based ad serving module 212 can generate sequences of data for one or more of the data constituting the user history data (e.g., past user events, time data, and impression type data). In some implementations, the sequences can be generated (constructed) in accordance with and for use in Markov models (e.g., Equation 1). For example, the sequence generator 254 can generate the sequences of data represented by the components of Equation 1 (i.e., E3, T3, M3, etc.), which are time-ordered sequences of data. The sequence generator 254 can generate sequences of data from the set of past user events that include a first sequence (which can be, for example, one event) and one or more successive sequences successive to the first sequence. The first sequence includes user history data defining a past user event, and each successive sequence includes user history data of a previous sequence and user history data defining an additional past user event. The additional past user event is selected according to the order in which the past user events occurred.

For example, the Markov model on which Equation 1 is based utilizes user history data defining a set of three events. As such the first sequence of E3 is e1 and the two successive sequences are e1×e2 (first successive sequence) and e1×e2× e3 (second successive sequence), respectively. The first successive sequence includes the user history data of the previous sequence, i.e., e1 from the first sequence, and an additional element e2, which is selected because e2 occurs immediately before e1 as determined by the past user event order. The second successive sequence includes the user history data of the previous sequence, i.e., e1×e2 from the first successive sequence and an additional element e3, which is selected because e3 occurs immediately before e2 as determined by the past user event order. Thus E3 can be represented as follows: e1*e1×e2*e1×e2×e3.

Markov models utilizing user history data defining a set of N events would cause the sequence generator 254 to generate N sequences for a component EN. For example, for a Markov model based on five events would include five sequences for E5 and be represented as e1*e1×e2*e1×e2×e3*e1×e2×e3× e4*e1×e2×e3×e4×e5.

Each of the sequences (e.g., e1, e1×e2, and e1×e2×e3) is a string of data. These strings/sequences characterize the time-ordered sequence of a user's activities (e.g., past user events) according to the Markov model implementation. The sequences can be used to select positioning multipliers from the multiplier data store 216 (each multiplier indicating the commercial nature of corresponding time-ordered sequences of user activities characterized by the strings). For example, the positioning multiplier generator 256 can be used to access the multiplier data store 216 and select positioning multipliers corresponding to each sequence.

In some implementations, each user event type is indicated by an alphanumeric value. For example, the past user event of not selecting a query result or an advertisement can be designated as "q"; the past user event of selecting one query result from the set of query results can be designated as "s"; and the past user event of selecting a top-positioned ad can be designated as "t". Thus a three-action user sequence including a first past user event of a query and top ad selection (e3); a second past user event occurring after the first past user event of a query and query result selection from the set (e2); and a most recently occurring past user event occurring after the second past user event of query and no selection of an advertisement or query result (e1)) can be represented by the following designator sequence (from most recently to first occurring) "q s t."

It follows that E3 can thus be represented by three sequences of data. The first sequence e1 includes user history data defining the most recent past user event, q; a first successive sequence successive to the first sequences includes user history data defining the most recent past user event and the second past user event, q×s; and a second successive sequence successive to the first successive sequence includes user history data defining the most recent past user event, the second past user event, and the first past user event, q×s×t.

The positioning multiplier generator 256 can access the multiplier data store 216 and select a first positioning multiplier corresponding to the first sequence q, a second positioning multiplier corresponding to the second sequence q×s, and third positioning multiplier corresponding to the third sequence q×s×t. To determine the commerciality of a user as indicated by E3 (the commerciality score for E3), the first, second, and third positioning multipliers can be multiplied together to determine a product of positioning multipliers. For example, if the first positioning multiplier is 0.9 (e.g., corresponding a slightly non-commercial sequence/user), the second positioning multiplier is 1 (e.g., corresponding to a commercially neutral sequence/user), and the third positioning multiplier is 1.2 (corresponding to a commercial sequence/user) then the commerciality score for E3 is the product of 0.9*1*1.2=1.08 (e.g., corresponding to a slightly commercial sequence/user). As previously described, each positioning multiplier corresponds to a sequence and is based on historical information about the commerciality of other users having executed the same sequence. Thus in the above example the first positioning multiplier (corresponding to sequence q) indicates the commerciality of other users who have submitted a query and then failed to select either a query result or an ad display on the query results page.

In a similar manner to that detailed above, the sequence generator can also generate sequence (each sequence being a string of data) for the other components of Equation 1 as shown in Table 1:

TABLE 1

| Component of Equation 1 | Sequence Representation |
|---|---|
| E3 | e1 * e1 × e2 * e1 × e2 × e3 |
| T3 | t1 * t1 × t2 * t1 × t2 × t3 |
| M3 | m1 * m1 × m2 * m1 × m2 × m3 |
| ET1 | e1 × t1 |
| EM1 | e1 × m1 |
| TM1 | t1 × m1 |
| ETM1 | e1 × t1 × m1 |

As with component E3, the positioning multiplier generator 256 can access the multiplier data store 216 and select positioning multipliers corresponding to sequences representing, for example, T3, M3, ET1, EM1, TM1, and ETM1.

For illustrative purposes, assume a user submitted a query and selected a RHS ad on the query results page (a user event designated as "h"), the display configuration of the ads being three right hand side ads with no top ads (an impression type designated as "r"). Thus EM1 is represented by sequence e1×m1 or, equivalently, h×r. Accordingly, the positioning multiplier generator 256 can access the multiplier data store 216 and select a positioning multiplier corresponding to h×r (indicating the commerciality of other users having executed the same action on a query results page with the same ad display configuration).

After the commerciality score has been determined for all components of the model (e.g., E3, T3, EM1, ETM1, etc.), the positioning multiplier generator 256 multiplies the individual commerciality scores of each component together to generate an overall commerciality score for the user. The overall commerciality score characterizes the commerciality of the user based on the user's user history data (and the order of the events defined by the user history data). For example, an overall commerciality score can be proportional to a probability that the user will select a given advertisement based on that user's past activity patterns.

In some implementations, the overall commerciality score can optionally also be based in part on an aggregate model using an aggregation of the user history data for a user. An aggregate model utilizes, for example, an aggregation of a set of past user events for a user (e.g., the last twenty past user events as defined by the user history data) but not the order in which the past user events occurred. Thus an aggregate model does not give weight to or indicate the relative order in which, for example, the past user events took place, as does the Markov-based model described above.

One exemplary aggregate model U can be represented by Equation 2:

$$U = Q \times A \times Qctr * Q \times A \times Qctr \times Exp * \text{Ignored Domains} \quad (2)$$

Q is the number of queries submitted by the user during a predetermined time period.

"A" is the number of ad selections associated with the query results returned from the queries, Q.

Qctr is the category of a query, and includes, for example, three categories: (1) a first page query (a query not associated with a request for a subsequent page of query results) that is not an exact duplicate of a recent query, e.g., a query in the last 10 queries in the last 30 minutes; (2) a first page query that is an exact duplicate of a recent query; and (3) a next page query, a query associated with a request for a subsequent page of query results.

Q×A×Qctr can define in whole or in part an aggregate user history data set. Exp describes the number of expected ad selections of the user during a predetermined time. For example, based on an aggregation of the user's past events a user CTR can be determined and used to estimate the number of expected ad selections for the user during a time period.

The Ignored Domains feature describes the preference of a user for a particular domain. For example, if a user tends to ignore (i.e., not select) ads associated with a particular domain then the Ignored Domains feature indicates that the user is unlikely to select ads from the domain.

Each of Q×A×Qctr, Q×A×Qctr×Exp, and Ignored Domains can be a string of data. Once each has string has been constructed from information included in the user history data store 210 by the user-based ad serving module 212, positioning multipliers corresponding to the strings can be looked up in, for example, the multiplier data store 216. A product of the positioning multipliers can then be determined (e.g., a commerciality score for U). This process is similar to that descried above with reference to the components of Equation 1.

As mentioned above, the overall commerciality score can be based on a Markov model and an aggregate model. For example, the overall commerciality score can be based on Equations 1 and 2 as shown in Equation 3:

$$SM = U * MM * MM \times A \times Qctr \quad (3)$$

where SM is a model incorporating elements of both Markov model MM and aggregate model U and MM×A×Qctr is a string of data (for which a corresponding positioning multiplier can be looked up in the multiplier data store 216) constructed from Markov model MM and components "A" and Qctr from aggregate model U. As such, for example, a product of commerciality scores (e.g., positioning multipliers) derived from U, MM, and MM×A×Qctr can be used to determine the overall commerciality score corresponding to the model SM. In some implementations, other models generating the overall commerciality score can be based on only portions of the SM model.

In some implementations, commerciality scores can initially be determined by an aggregate model, e.g., U, and then adjusted by the commerciality scores determined by a model that accounts for the relative order of the past user events, e.g., MM. In other implementations, the various models (e.g., U and MM) can be deployed simultaneously and the commerciality scores from the two models can be combined to determine an overall commerciality score.

Regardless of the particular model or implementation employed, the positioning module 214 can use the overall commerciality score to generate positioning data for determining how the ordered candidate ads are to be displayed to the user, such as modifying the number and/or positioning of the ordered candidate ads.

Figure 3:
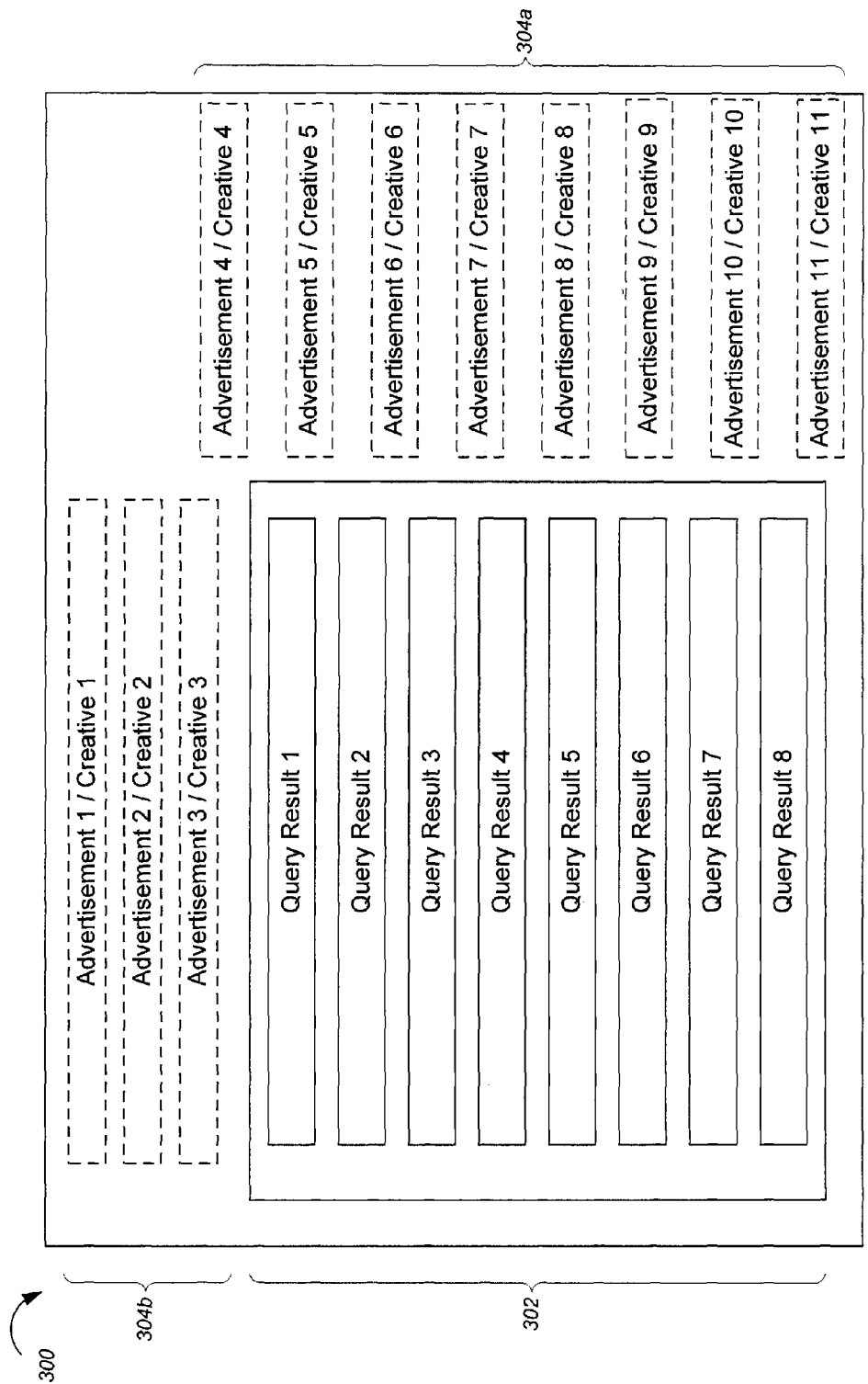
FIG. 3 is a block diagram of an example query results page having query results and advertisements.

FIG. 3 is a block diagram of an example query results page 300 having query results 302 and advertisements 304. For example, in response to a user query, a query results page 300 can be returned with query results 302 and ads 304. The ads 304 can be displayed, for example, as top ads 304b (e.g., three top ads) and RHS ads 304a (e.g., eight RHS ads). Ads can also be positioned in other locations on a results page, e.g., along the left hand side or along the bottom of the page. Generally, advertisers desire to have their ads placed as one of the top ads 304b, as such ads are more prominently displayed to a user than, for example, the RHS ads 304a.

The ad serving module 206 can generate, for example, the set of ordered candidate ads illustrated on query results page 300 (e.g., a three top ads, eight RHS ads, and the respective positioning of each ad). In turn, the positioning data generated by the positioning system 218 (based on the user history data) can alter the number and/or positioning of the set of ordered candidate ads according to the commerciality of the user submitting the query. For example, if the user is determined to be a non-commercial user as indicated by the overall commerciality score for that user (e.g., positioning data) then the positioning system 218 can, for example, eliminate a number of RHS ads (e.g., Advertisement 7/Creative 7-Advertisement 11/Creative 11) and/or demote one or more of the top ads (e.g., Advertisement 1/Creative 1-Advertisement 3/Creative 3) to RHS ad positions. Such an ad presentation may be appropriate for a non-commercial user as compared with the original set of ordered candidate ads from the ad serving module 206.

Conversely, the ad serving module 206 may generate a set of ordered candidate ads for display on a query results page having only one top ad and three RHS ads. If the user is determined to be a commercial user then the positioning system 218 can, for example, increase the number of RHS ads (e.g., from three to eight) and/or promote one or more of the RHS ads to top ad positions. Such an ad presentation may enhance the commercial user's experience.

In some implementations, the positioning module 214 can use one or more thresholds to determine which ordered candidate ads are to be presented to the user (e.g., number of ads) and in what positions they will be presented. Generally, a promotion threshold can be one or more cutoffs for a predicted CTR associated with the ad candidate, the ad candidate's target bid, or some combination of the two. Candidate ads that exceed the promotion threshold can be eligible for promotion to the top ad slots (e.g., from the RHS ad slots/positions).

The positioning module 214 can also use a disabling threshold, which can be one or more cutoffs for a predicted CTR associated with the ad candidate or other quality score. If an ad candidate is an exact match for a keyword in the user's query, the ad candidate can be automatically eligible for a RHS ad slot. However, if the ad candidate is not an exact match, the disabling threshold can be used to determine whether the ad candidate is eligible for a RHS ad slot. That is, if an ad candidate is not an exact match, it must be a close enough match to a query keyword (e.g., as determined by a predicted CTR that exceeds the disabling threshold) to be eligible to be displayed to the user in a RHS ad slot. Non-matching ad candidates that do not exceed the disabling threshold are disabled (e.g., eliminated from ad slot selection).

For example, consider a promotion threshold set at a predicted CTR of 8:1 (i.e., the probability that an ad will be selected is twelve and one-half percent), a disabling threshold set at predicted CTR of 20:1 (i.e., the probability that an ad will be selected is five percent), and an ad candidate that has a user-independent predicted CTR of 10:1 (i.e., the probability that the ad will be selected by any user is ten percent).

As currently presented, the ad candidate would be included in the ads provided for display to a user (as the ad's user-independent predicted CTR exceeds that of the disabling threshold value) but would not be promoted (as the ad's user-independent predicted CTR does not surpass that of the promotion threshold value). However, if the user-independent predicted CTR of the ad is modified to 4:1 (i.e., the probability that the ad will be selected is twenty-five percent) as a result of positioning data determined for that user (i.e., a user-dependent CTR is determined) then the ad would be promoted. In other words, the ad's position would be adjusted because the ad's user-dependent CTR exceeds the promotion threshold. Further, if the predicted CTR of the ad is modified to 25:1 (i.e., the probability that an ad will be selected is four percent) as a result of positioning data then the ad would no longer be provided for display to the user as the ad's user-dependent predicted CTR would no longer exceed the disabling threshold.

As illustrated in the example above the number and/or positioning of the ads provided for display to a user depends on the modifications/adjustments to the user-independent CTRs of the candidate ad(s) as determined by the positioning data. In some implementations, the ad serving module 206 can provide a set of ordered candidate ads relevant to a user submitted query. Before user-based correction is applied (i.e., before the positioning data is used to modify the number and/or positioning of the set of ordered candidate ads), there are a certain number of ads that will be presented to the user. The actual number of ads presented to the user as determined by the positioning system 218 is based on a prediction of the CTR of the ad (i.e., the user-dependent predicted CTR), a probability. The user-dependent predicted CTR is based on both the commerciality of the user (e.g., as determined by Equation 1 or Equation 3) and the user-independent predicted CTRs (e.g., quality scores) of the ordered ad candidates. The commerciality of the user and the user-independent predicted CTRs are also probabilities. These probabilities are multiplied together and used to determine the actual number of ads presented to the user.

For example, for a given ad, independent of user, the probability that the ad will be selected is ten percent (e.g., user-independent predicted CTR). The user that submitted the query is a commercial user and is twice as likely to select an ad as opposed to not selecting an ad (e.g., overall commerciality score for that user). As such, the probability that this user will select this ad is twenty percent (2×0.1=0.2), i.e., the user-dependent CTR for the ad is twenty percent.

§3.0 Advertising Serving System Activities

Figure 4:
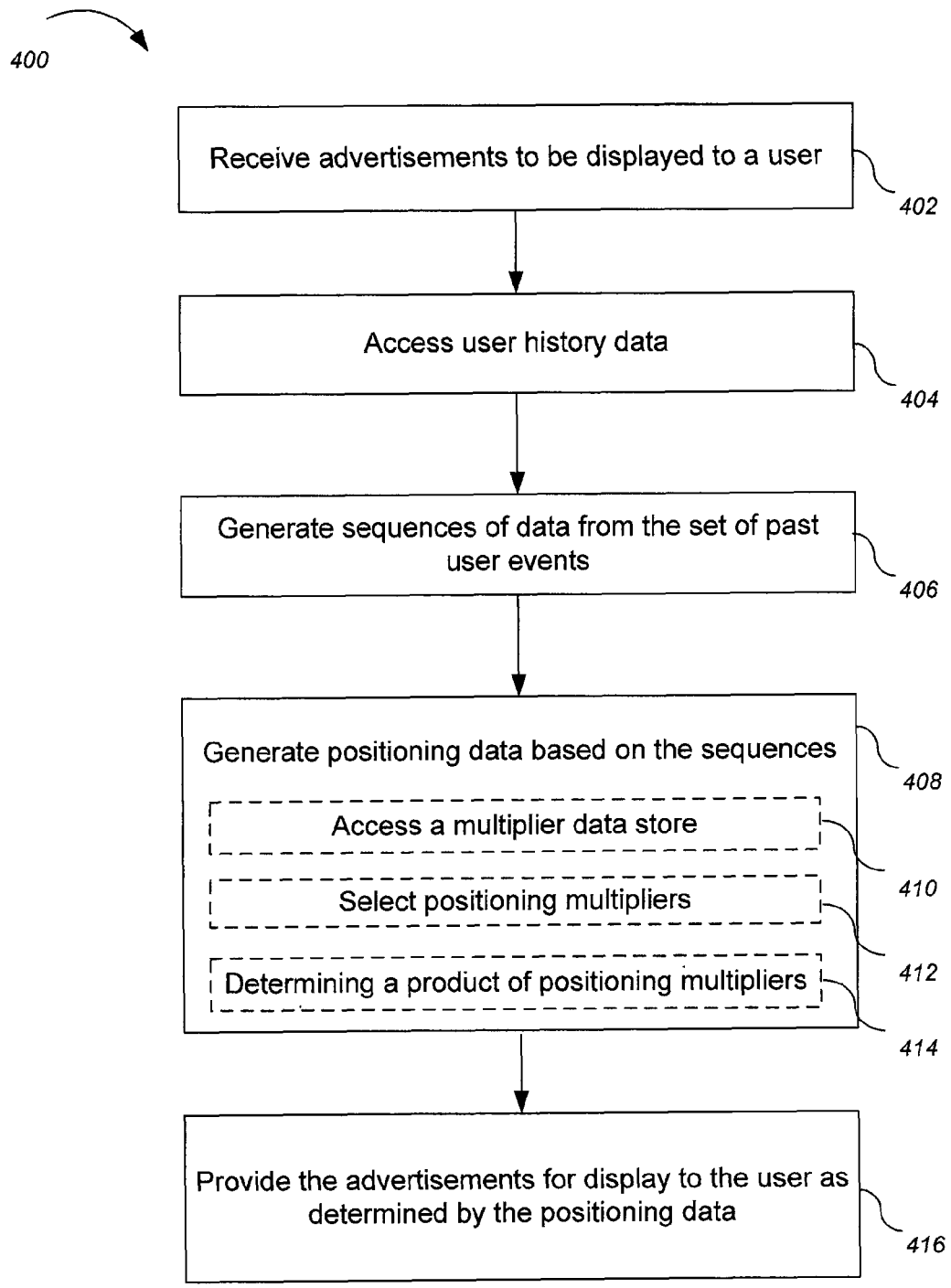
FIG. 4 is a flow diagram of an example process for providing advertisements for display to a user based on user history information.

FIG. 4 is a flow diagram of an example process 400 for providing advertisements for display to a user based on user history information. For example, the process 400 can be implemented in the advertising serving system 200 of FIG. 2A.

Advertisements to be displayed to a user are received (402). For example, positioning system 218 can receive advertisement to be displayed to a user.

User history data is accessed (404). For example, the user-based ad serving module 212 can access user history data from a user history data store 210. The user history data defines a set of past user events associated with the user and defines the order in which the past user events occurred.

Sequences of data from the set of past user events are generated (406). For example, the user-based ad serving module 212 can generate sequences of data. The sequences include a first sequence and one or more successive sequences successive to the first sequence. The first sequence includes user history data (e.g., from the user history data store 210) defining a past user event. Optionally, the first sequence can also include time data and/or impression data associated with the past user event. Each successive sequence includes the user history data of the previous sequence and user history data defining an additional past user event from the set of past user events. Optionally, each successive sequence can also include time data and/or impression data associated with the additional past user event. The additional past user event can be selected according to the order in which the past user events occurred (e.g., the additional past user occurring before the past user event of the first sequence).

Positioning data based on the sequences are generated (408). For example, the positioning module 214 can generate positioning data. The positioning data determines the number and/or positioning of advertisements to be displayed to the user. The positioning data can, for example, be generated by selecting positioning multipliers in the multiplier data store 216, the selection being based on the sequences, and the generation of the positioning data being based on the positioning multipliers.

A multiplier data store that stores positioning multipliers partitioned according to corresponding sequences is accessed (410). For example, the user-based ad serving module 212 can access the multiplier data store 216 which stores positioning multipliers.

Positioning multipliers from the multiplier data store are selected (412). For example, the user-based ad serving module 212 can select positioning multipliers from the multiplier data store 216 based on corresponding sequences.

A product of the positioning multipliers is determined (414). For example, the positioning system 218 can determine a product of the positioning multipliers, and the positioning data can be generated from the product of the positioning multipliers.

Advertisements for display to the user (as determined by the positioning data) are provided (416). For example, the positioning module 214 can provide advertisements for display to the user as determined by the positioning data.

Techniques, methods, apparatus, and a system for presenting sponsored content (e.g., advertising) have been described herein. In some implementations, the techniques, methods, apparatus, and system can be used to facilitate online advertising occurring over a network, including one or more local area networks (LANs) or a wide area network (WAN), for example, the Internet. Any reference herein to "online advertising" is meant to include any such advertising occurring over a network and is not limited to advertising over the Internet. Further, the techniques and system described can be used to distribute other forms of sponsored content over other distribution media (e.g., not online), including those over broadcast, wireless, radio or other distribution networks. By way of example, the techniques and system are discussed in an online advertising context, but other contexts are possible. For example other forms of content can be delivered other than advertisements.

Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving a set of advertisements to be displayed to a user, wherein advertisements in the set of advertisements are arranged according to a first order;
   accessing user history data, the user history data defining a set of past user events, including a most recent past user event, associated with the user and defining an order in which the past user events occurred and the user history data comprising impression type data defining a display configuration of advertisements associated with the most recent past user event, wherein the display configuration specifies an arrangement of advertisements as displayed to a user;
   constructing, by one or more computer processors, sequences of data from the set of past user events, the constructed sequences including a first sequence that includes user history data defining the most recent past user event from the set of past user events and the impression type data and one or more successive sequences successive to the first sequence, wherein:
      each of the one or more successive sequences includes user history data of a previous sequence and user history data defining an additional past user event from the set of past user events according to the order in which the past user events occurred;
   generating, by one or more computer processors, positioning data based on the constructed sequences and the order in which the past user events occurred, wherein the positioning data specify changes to the first order of the set of advertisements to be displayed to the user, the changes to the first order resulting in a second order that is different from the first order, wherein generating positioning data comprises:
      determining a product of positioning multipliers, each positioning multiplier corresponding to a constructed sequence and representing a commerciality of a user that performed the corresponding constructed sequence, the commerciality of a user being indicative of the user's interests in commercial offerings; and
   providing one or more advertisements from the set of advertisements for display to the user in the second order based at least in part on the positioning data.

2. The method of claim 1, wherein the user history data includes time data defining for each of the past user events a time associated with the event.

3. The method of claim 1, wherein each of the past user events corresponds to an action of the user in response to a query submitted by the user, the action including at least one of no query results or advertisements selected, one query result selected from a first set of query results, one query result selected from a second set of query results, multiple query results selected, a top advertisement selected, a right-hand-side advertisement selected, multiple advertisements selected, and both a query result and an advertisement selected.

4. The method of claim 1, wherein:
   the set of past user events includes:
      a first past user event;
      a second past user event occurring after the first past user event; and
      wherein the most recent past user event occurs after the second past user event; and
   the constructed sequences include:
      a second sequence including user history data defining the most recent past user event and the second past user event; and
      a third sequence including user history data defining the most recent past user event, the second past user event, and the first past user event.

5. The method of claim 4, wherein the positioning multipliers include:
   a first positioning multiplier corresponding to the first sequence;
   a second positioning multiplier corresponding to the second sequence; and
   a third positioning multiplier corresponding to the third sequence.

6. The method of claim 5, wherein determining a product of positioning multipliers includes determining a product of the first positioning multiplier, the second positioning multiplier, and the third positioning multiplier.

7. The method of claim 1, wherein generating positioning data based on the constructed sequences includes:
   accessing a multiplier data store that stores positioning multipliers partitioned according to corresponding sequences; and
   selecting positioning multipliers from the multiplier data store according to the constructed sequences.

8. The method of claim 1, wherein constructing sequences of data from the set of past user events includes:
   constructing sequences of data from the set of past user events based on a Markov model utilizing the set of past user events and the order in which the past user events occurred.

9. The method of claim 1, wherein an advertisement from the set of advertisements has a first click-through-rate, the method further comprising:
   adjusting the first click-through-rate to a second click-through-rate for the advertisement based at least in part on the positioning data.

10. The method of claim 9, wherein the first click-through-rate does not exceed a promotion threshold, the method further comprising:
    determining that the second click-through-rate for the advertisement exceeds the promotion threshold; and
    changing an order of the advertisement in the set of advertisements in response to determining that the second click-through-rate for the advertisement exceeds the promotion threshold.

11. The method of claim 9, wherein the positioning data specify at least one of a number and positioning of advertisements in the set of advertisements to be displayed to the user.

12. A system, comprising:
    a user history data store storing user history data, the user history data defining a set of past user events, including a most recent past user event, associated with the user and defining an order in which the past user events occurred and the user history data comprising impression type data defining a display configuration of advertisements associated with the most recent past user event, wherein the display configuration specifies an arrangement of advertisements as displayed to a user; and
    a positioning system configured for:
       receiving a set of advertisements to be displayed to the user, wherein advertisements in the set of advertisements are arranged according to a first order;
       accessing the user history data store;
       constructing sequences of data from the set of past user events, the sequences including a first sequence that includes user history data defining the most recent past user event from the set of past user events and the impression type data and one or more successive sequences successive to the first sequence, wherein:
  each of the one or more successive sequences includes user history data of a previous sequence and user history data defining an additional past user event from the set of past user events according to the order in which the past user events occurred;
  generating positioning data based on the constructed sequences and the order in which the past user events occurred, wherein the positioning data specify changes to the first order of the set of advertisements to be displayed to the user, the changes to the first order resulting in a second order that is different from the first order, wherein generating positioning data comprises:
    determining a product of positioning multipliers, each positioning multiplier corresponding to a constructed sequence and representing a commerciality of a user that performed the corresponding constructed sequence, the commerciality of a user being indicative of the user's interests in commercial offerings; and
  providing one or more advertisements from the set of advertisements for display to the user in the second order based at least in part on the positioning data.

13. The system of claim 12, further comprising:
a multiplier data store storing positioning multipliers, each positioning multiplier corresponding to a sequence; and
wherein to generate positioning data based on the constructed sequences, the positioning system is configured for:
  accessing a multiplier data store that stores positioning multipliers partitioned according to corresponding sequences; and
  selecting positioning multipliers from the multiplier data store according to the constructed sequences.

14. The system of claim 13, wherein:
the set of past user events includes:
  a first past user event;
  a second past user event occurring after the first past user event; and
  wherein the most recent past user event occurs after the second past user event; and
the constructed sequences include:
  a second sequence including user history data defining the most recent past user event and the second past user event; and
  a third sequence including user history data defining the most recent past user event, the second past user event, and the first past user event.

15. The system of claim 14, wherein the positioning multipliers include:
  a first positioning multiplier corresponding to the first sequence;
  a second positioning multiplier corresponding to the second sequence; and
  a third positioning multiplier corresponding to the third sequence.

16. The system of claim 15, wherein determining a product of positioning multipliers includes determining a product of the first positioning multiplier, the second positioning multiplier, and the third positioning multiplier.

17. A computer-implemented method, comprising:
  receiving a set of advertisements to be displayed to a user, wherein advertisements in the set of advertisements are arranged according to a first order;
  accessing user history data, the user history data defining a set of past user events for the user, an order in which the past user events occurred, and including time data defining for each of the past user events a time associated with the event and impression type data defining for each past user event a display configuration of advertisements associated with the event;
  constructing, by one or more computer processors, sequences of data from the user history data, the sequences including a first sequence and one or more successive sequences successive to the first sequence, wherein:
    the first sequence includes user history data defining a past user event from the set of past user events, and including at least one of time data and impression type data associated with the past user event; and
    each of the one or more successive sequences includes:
      user history data of a previous sequence; and
      user history data defining an additional past user event from the set of past user events according to the order in which the past user events occurred, and including at least one of time data and impression type data associated with the additional past user event;
  generating an aggregate user history data set defining an aggregation of the set of past user events, wherein the aggregate user history data set does not define an order in which past user events occurred;
  generating positioning data, by one or more computer processors, based on the constructed sequences that include the user history data that does define an order in which the past user events occurred and on the aggregate user history data set that does not define an order in which past user events occurred, wherein the positioning data specify changes to the first order of the set of advertisements to be displayed to the user, the changes to the first order resulting in a second order that is different from the first order, wherein generating positioning data comprises:
    determining a product of positioning multipliers, each positioning multiplier corresponding to a constructed sequence and representing a commerciality of a user that performed the corresponding constructed sequence, the commerciality of a user being indicative of the user's interests in commercial offerings; and
  providing one or more advertisements from the set of advertisements for display to the user in the second order based at least in part on the positioning data.

18. The method of claim 17, wherein generating sequences of data from the set of past user events includes:
  generating sequences of data from the set of past user events based on a Markov model utilizing the set of past user events, the order in which the past user events occurred, the time data, and the impression type data.

19. A system comprising:
one or more data processors; and
instructions stored on a computer readable storage medium that when executed by the one or more data processors cause the one or more data processors to perform operations comprising:
  receiving a set of advertisements to be displayed to a user, wherein advertisements in the set of advertisements are arranged according to a first order;

accessing user history data, the user history data defining a set of past user events for the user, an order in which the past user events occurred, and including time data defining for each of the past user events a time associated with the event and impression type data defining for each past user event a display configuration of advertisements associated with the event;

constructing sequences of data from the user history data, the sequences including a first sequence and one or more successive sequences successive to the first sequence, wherein:

the first sequence includes user history data defining a past user event from the set of past user events, and including at least one of time data and impression type data associated with the past user event; and each of the one or more successive sequences includes:
user history data of a previous sequence; and
user history data defining an additional past user event from the set of past user events according to the order in which the past user events occurred, and including at least one of time data and impression type data associated with the additional past user event;

generating an aggregate user history data set defining an aggregation of the set of past user events, wherein the aggregate user history data set does not define an order in which past user events occurred;

generating positioning data, by one or more computer processors, based on the constructed sequences that include the user history data that does define an order in which the past user events occurred and on the aggregate user history data set that does not define an order in which past user events occurred, wherein the positioning data specify changes to the first order of the set of advertisements to be displayed to the user, the changes to the first order resulting in a second order that is different from the first order, wherein generating positioning data comprises:

determining a product of positioning multipliers, each positioning multiplier corresponding to a constructed sequence and representing a commerciality of a user that performed the corresponding constructed sequence, the commerciality of a user being indicative of the user's interests in commercial offerings; and providing one or more advertisements from the set of advertisements for display to the user in the second order based at least in part on the positioning data.

20. The system of claim 19, wherein generating sequences of data from the set of past user events includes:

generating sequences of data from the set of past user events based on a Markov model utilizing the set of past user events, the order in which the past user events occurred, the time data, and the impression type data.

21. A computer-readable storage medium having instructions stored thereon, which, when executed by one or more data processors, causes the one or more data processors to perform operations comprising:

receiving a set of advertisements to be displayed to a user, wherein advertisements in the set of advertisements are arranged according to a first order;

accessing user history data, the user history data defining a set of past user events, including a most recent past user event, associated with the user and defining an order in which the past user events occurred and the user history data comprising impression type data defining a display configuration of advertisements associated with the most recent past user event, wherein the display configuration specifies an arrangement of advertisements as displayed to a user;

constructing sequences of data from the set of past user events, the constructed sequences including a first sequence that includes user history data defining the most recent past user event from the set of past user events and the impression type data and one or more successive sequences successive to the first sequence, wherein each of the one or more successive sequences includes user history data of a previous sequence and user history data defining an additional past user event from the set of past user events according to the order in which the past user events occurred;

generating, by one or more computer processors, positioning data based on the constructed sequences and the order in which the past user events occurred, wherein the positioning data specify changes to the first order of the set of advertisements to be displayed to the user, the changes to the first order resulting in a second order that is different from the first order, wherein generating positioning data comprises:

determining a product of positioning multipliers, each positioning multiplier corresponding to a constructed sequence and representing a commerciality of a user that performed the corresponding constructed sequence, the commerciality of a user being indicative of the user's interests in commercial offerings; and providing one or more advertisements from the set of advertisements for display to the user in the second order based at least in part on the positioning data.

\* \* \* \* \*